United States Patent
Malla et al.

(10) Patent No.: US 11,577,757 B2
(45) Date of Patent: Feb. 14, 2023

(54) SYSTEM AND METHOD FOR FUTURE FORECASTING USING ACTION PRIORS

(71) Applicant: Honda Motor Co., Ltd., Tokyo (JP)

(72) Inventors: Srikanth Malla, Sunnyvale, CA (US); Chiho Choi, San Jose, CA (US); Behzad Dariush, San Ramon, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 307 days.

(21) Appl. No.: 16/913,260

(22) Filed: Jun. 26, 2020

(65) Prior Publication Data

US 2021/0129871 A1 May 6, 2021

Related U.S. Application Data (60) Provisional application No. 62/929,296, filed on Nov. 1, 2019.

(51) Int. Cl.
*B60W 60/00* (2020.01)
*G06T 7/70* (2017.01)
*G06V 20/58* (2022.01)

(52) U.S. Cl.
CPC ......... *B60W 60/00272* (2020.02); *G06T 7/70* (2017.01); *G06V 20/58* (2022.01);
(Continued)

(58) Field of Classification Search
CPC ... B60W 60/00272; B60W 2554/4029; B60W 2554/4049; B60W 50/0097;
(Continued)

(56) References Cited

U.S. PATENT DOCUMENTS

| 10,678,240 B2 * | 6/2020 | Pollach | B60W 40/02 |
| 10,884,409 B2 * | 1/2021 | Mercep | G01S 7/417 |

(Continued)

FOREIGN PATENT DOCUMENTS

| JP | 2017142735 | 8/2017 |
| WO | WO2019106789 | 6/2019 |

OTHER PUBLICATIONS

Alexandre Alahi, Kratarth Goel, Vignesh Ramanathan, Alexandre Robicquet, Li Fei-Fei, and Silvio Savarese. "Social lstm: Human trajectory prediction in crowded spaces." In Proceedings of the IEEE Conference on Computer Vision and Pattern Recognition, pp. 961-971, 2016.

(Continued)

*Primary Examiner* — David T Welch
(74) *Attorney, Agent, or Firm* — Rankin, Hill & Clark LLP (57) ABSTRACT

A system for method for future forecasting using action priors that include receiving image data associated with a surrounding environment of an ego vehicle and dynamic data associated with dynamic operation of the ego vehicle. The system and method also include analyzing the image data and detecting actions associated with agents located within the surrounding environment of the ego vehicle and analyzing the dynamic data and processing an ego motion history of the ego vehicle. The system and method further include predicting future trajectories of the agents located within the surrounding environment of the ego vehicle and a future ego motion of the ego vehicle within the surrounding environment of the ego vehicle.

20 Claims, 6 Drawing Sheets

(52) U.S. Cl.
CPC ............... *B60W 2554/4029* (2020.02); *B60W 2554/4049* (2020.02); *G06T 2207/20081* (2013.01); *G06T 2207/20084* (2013.01); *G06T 2207/30261* (2013.01); *G06T 2210/12* (2013.01)

(58) Field of Classification Search
CPC ................. B60W 2556/10; G06T 7/70; G06T 2207/20081; G06T 2207/20084; G06T 2207/30261; G06T 2210/12; G06V 20/58; G06V 10/82; G06K 9/6273
See application file for complete search history.

(56) References Cited

U.S. PATENT DOCUMENTS

| | | | |
|---|---|---|---|
| 11,087,477 B2* | 8/2021 | Choi | G06N 3/08 |
| 11,308,338 B2* | 4/2022 | Yang | G06V 10/42 |
| 2017/0010618 A1* | 1/2017 | Shashua | G08G 1/096725 |
| 2018/0024562 A1* | 1/2018 | Bellaiche | G06V 20/588 701/26 |
| 2018/0025235 A1* | 1/2018 | Fridman | G06T 7/12 382/103 |
| 2019/0258251 A1* | 8/2019 | Ditty | G06V 20/58 |
| 2019/0291728 A1* | 9/2019 | Shalev-Shwartz | B60W 50/0097 |
| 2019/0333381 A1* | 10/2019 | Shalev-Shwartz | B60W 30/162 |
| 2019/0361439 A1* | 11/2019 | Zeng | G06V 10/82 |
| 2019/0384294 A1* | 12/2019 | Shashua | G06V 20/584 |
| 2020/0026282 A1* | 1/2020 | Choe | B60W 60/001 |
| 2020/0184233 A1* | 6/2020 | Berberian | G06T 7/74 |
| 2020/0276988 A1* | 9/2020 | Graves | B60W 60/0016 |
| 2020/0309541 A1* | 10/2020 | Lavy | G01C 21/1656 |
| 2020/0353943 A1* | 11/2020 | Siddiqui | G06V 20/182 |
| 2021/0101616 A1* | 4/2021 | Hayat | G06T 7/20 |
| 2022/0082403 A1* | 3/2022 | Shapira | G06V 20/647 |
| 2022/0126864 A1* | 4/2022 | Moustafa | B60W 60/0011 |

OTHER PUBLICATIONS

Apratim Bhattacharyya, Mario Fritz, and Bernt Schiele. "Long-term on-board prediction of people in traffic scenes under uncertainty." In Proceedings of the IEEE Conference on Computer Vision and Pattern Recognition, pp. 4194-1202, 2018.

Fabian Caba Heilbron, Victor Escorcia, Bernard Ghanem, and Juan Carlos Niebles. "Activitynet: A large-scale video benchmark for human activity understanding." In Proceedings of the IEEE Conference on Computer Vision and Pattern Recognition, pp. 961-970, 2015.

Holger Caesar, Varun Bankiti, Alex H Lang, Sourabh Vora, Venice Erin Liong, Qiang Xu, Anush Krishnan, Yu Pan, Giancarlo Baldan, and Oscar Beijbom. "nuscenes: A multimodal dataset for autonomous driving." arXiv preprint arXiv:1903.11027, 2019.

Joao Carreira and Andrew Zisserman. "Quo vadis, action recognition? a new model and the kinetics dataset." In Proceedings of the IEEE Conference on Computer Vision and Pattern Recognition, pp. 6299-6308, 2017.

Rohan Chandra, Uttaran Bhattacharya, Aniket Bera, and Dinesh Manocha. "Traphic: Trajectory prediction in dense and heterogeneous traffic using weighted interactions." In Proceedings of the IEEE Conference on Computer Vision and Pattern Recognition, pp. 8483-8492, 2019.

Ming-Fang Chang, John Lambert, Patsorn Sangkloy, Jagjeet Singh, Slawomir Bak, Andrew Hartnett, De Wang, Peter Carr, Simon Lucey, Deva Ramanan, et al. "Argoverse: 3d tracking and forecasting with rich maps." In Proceedings of the IEEE Conference on Computer Vision and Pattern Recognition, pp. 8748-8757, 2019.

Chiho Choi and Behzad Dariush. "Looking to relations for future trajectory forecast." In the IEEE International Conference on Computer Vision (ICCV), Oct. 2019.

Chiho Choi, Abhishek Patil, and Srikanth Malla. "Dragon: A causal reasoning framework for future trajectory forecast." arXiv preprint arXiv:1908.00024, 2019.

Nachiket Deo and Mohan M. Trivedi. "Multi-modal trajectory prediction of surrounding vehicles with maneuver based lstms." In 2018 IEEE Intelligent Vehicles Symposium (IV), pp. 1179-1184. IEEE, 2018.

Andreas Geiger, Philip Lenz, Christoph Stiller, and Raquel Urtasun. "Vision meets robotics: The kitti dataset." The International Journal of Robotics Research, 32(11):1231-1237, 2013.

Chunhui Gu, Chen Sun, David A Ross, Carl Vondrick, Caroline Pantofaru, Yeqing Li, Sudheendra Vijayanarasimhan, George Toderici, Susanna Ricco, Rahul Sukthankar, et al. "Ava: A video dataset of spatio-temporally localized atomic visual actions." In Proceedings of the IEEE Conference on a Computer Vision and Pattern Recognition, pp. 6047-6056, 2018.

Agrim Gupta, Justin Johnson, Li Fei-Fei, Silvio Savarese, and Alexandre Alahi. "Social gan: Socially acceptable trajectories with generative adversarial networks." In Proceedings of the IEEE Conference on Computer Vision and Pattern Recognition, pp. 2255-2264, 2018.

Kensho Hara, Hirokatsu Kataoka, and Yutaka Satoh. "Can spatiotemporal 3d cnns retrace the history of 2d cnns and imagenet?" In Proceedings of the IEEE conference on Computer Vision and Pattern Recognition, pp. 6546-6555, 2018.

Noureldien Hussein, Efstratios Gavves, and Arnold WM Smeulders. "Timeception for complex action recognition." In Proceedings of the IEEE Conference on Computer Vision and Pattern Recognition, pp. 254-263, 2019.

Andrej Karpathy, George Toderici, Sanketh Shetty, Thomas Leung, Rahul Sukthankar, and Li Fei-Fei. "Large-scale video classification with convolutional neural networks." In Proceedings of the IEEE conference on Computer Vision and Pattern Recognition, pp. 1725-1732, 2014.

R. Kesten, M. Usman, J. Houston, T. Pandya, K. Nadhamuni, A. Ferreira, M. Yuan, B. Low, A. Jain, P. Ondruska, S. Omari, S. Shah, A. Kulkarni, A. Kazakova, C. Tao, L. Platinsky, W. Jiang, and V. Shet. "Lyft level 5 av dataset 2019." https://level5.lyft.com/dataset/, 2019.

H. Kuehne, H. Jhuang, E. Garrote, T. Poggio, and T. Serre. "HMDB: a large video database for human motion recognition." In Proceedings of the International Conference on Computer Vision (ICCV), 2011.

Tian Lan, Tsung-Chuan Chen, and Silvio Savarese. "A hierarchical representation for future action prediction." In European Conference on Computer Vision, pp. 689-704. Springer, 2014.

Namhoon Lee, Wongun Choi, Paul Vernaza, Christopher B. Choy, Philip HS Torr, and Manmohan Chandraker. "Desire: Distant future prediction in dynamic scenes with interacting agents." In Proceedings of the IEEE Conference on Computer Vision and Pattern Recognition, pp. 336-345, 2017.

Alon Lerner, Yiorgos Chrysanthou, and Dani Lischinski. "Crowds by example." In Computer graphics forum, vol. 26, pp. 655-664. Wiley Online Library, 2007.

Jiachen Li, Hengbo Ma, and Masayoshi Tomizuka. "Conditional generative neural system for probabilistic trajectory prediction." In 2019 IEEE Conference on Robotics and Systems (IROS), 2019.

Jiachen Li, Hengbo Ma, and Masayoshi Tomizuka. "Interaction-aware multi-agent tracking and probabilistic behavior prediction via adversarial learning." In 2019 IEEE In—ternational Conference on Robotics and Automation (ICRA). IEEE, 2019.

Yuexin Ma, Xinge Zhu, Sibo Zhang, Ruigang Yang, Wenping Wang, and Dinesh Manocha. "Trafficpredict: Trajectory prediction for heterogeneous traffic-agents." In Proceedings of the AAAI Conference on Artificial Intelligence, vol. 33, pp. 6120-6127, 2019.

Srikanth Malla and Chiho Choi. "Nemo: Future object localization using noisy ego priors." arXiv preprint arXiv:1909.08150, 2019.

Sangmin Oh, Anthony Hoogs, Amitha Perera, Naresh Cuntoor, Chia-Chih Chen, Jong Taek Lee, Saurajit Mukherjee, JK Aggarwal, Hyungtae Lee, Larry Davis, et al. "A large—scale benchmark dataset for event recognition in surveillance video." In CVPR 2011, pp. 3153-3160. IEEE, 2011.

(56) References Cited

OTHER PUBLICATIONS

Seong Hyeon Park, ByeongDo Kim, Chang Mook Kang, Chung Choo Chung, and Jun Won Choi. "Sequence-to-sequence prediction of vehicle trajectory via lstm encoder—decoder architecture." In 2018 IEEE Intelligent Vehicles Symposium (IV), pp. 1672-1678. IEEE, 2018.

Abhishek Patil, Srikanth Malla, Haiming Gang, and Yi-Ting Chen. The h3d dataset for full-surround 3d multi-object detection and tracking in crowded urban scenes. arXiv preprint arXiv:1903.01568, 2019.

Stefano Pellegrini, Andreas Ess, and Luc Van Gool. "Improving data association by joint modeling of pedestrian trajectories and groupings." In European conference on computer vision, pp. 452-465. Springer, 2010.

Amir Rasouli, Iuliia Kotseruba, Toni Kunie, and John K. Tsotsos. "Pie: A large-scale dataset and models for pedestrian intention estimation and trajectory prediction." In the IEEE International Conference on Computer Vision (ICCV), Oct. 2019.

Amir Rasouli, Iuliia Kotseruba, and John K Tsotsos. "Are they going to cross? a benchmark dataset and baseline for pedestrian crosswalk behavior." In Proceedings of the IEEE International Conference on Computer Vision, pp. 206-213, 2017.

Nicholas Rhinehart, Kris M Kitani, and Paul Vernaza. "R2p2: A reparameterized pushforward policy for diverse, precise generative path forecasting." In Proceedings of the European Conference on Computer Vision (ECCV), pp. 772-788, 2018.

Alexandre Robicquet, Amir Sadeghian, Alexandre Alahi, and Silvio Savarese. "Learning social etiquette: Human trajectory understanding in crowded scenes." In European conference on computer vision, pp. 549-565. Springer, 2016.

Christoph Schöller, Vincent Aravantinos, Florian Lay, and Alois Knoll. The simpler the better: Constant velocity for pedestrian motion prediction. arXiv preprint arXiv:1903.07933, 2019.

Gunnar A Sigurdsson, Abhinav Gupta, Cordelia Schmid, Ali Farhadi, and Karteek Alahari. "Actor and observer: Joint modeling of first and third-person videos." In Proceedings of the IEEE Conference on Computer Vision and Pattern Recognition, pp. 7396-7404, 2018.

Gunnar A. Sigurdsson, Gül Varol, Xiaolong Wang, Ali Farhadi, Ivan Laptev, and Abhinav Gupta. "Hollywood in homes: Crowdsourcing data collection for activity understanding." In European Conference on Computer Vision, 2016.

Karen Simonyan and Andrew Zisserman. "Two-stream convolutional networks for action recognition in videos." In Advances in neural information processing systems, pp. 568-576, 2014.

Chaoming Song, Zehui Qu, Nicholas Blumm, and Albert-LászlóBarabási. "Limits of predictability in human mobility." Science, 327(5968):1018-1021, 2010.

Khurram Soomro, Amir Roshan Zamir, and Mubarak Shah. "Ucf101: A dataset of 101 human actions classes from videos in the wild." arXiv preprint arXiv:1212.0402, 2012.

Chen Sun, Abhinav Shrivastava, Carl Vondrick, Kevin Murphy, Rahul Sukthankar, and Cordelia Schmid. "Actor-centric relation network." In Proceedings of the European Conference on Computer Vision (ECCV), pp. 318-334, 2018.

Du Tran, Lubomir Bourdev, Rob Fergus, Lorenzo Torresani, and Manohar Paluri. "Learning spatiotemporal features with 3d convolutional networks." In Proceedings of the IEEE international conference on computer vision, pp. 4489-4497, 2015.

Gül Varol, Ivan Laptev, and Cordelia Schmid. "Long-term temporal convolutions for action recognition." IEEE transactions on pattern analysis and machine intelligence, 40(6):1510-1517, 2017.

Anirudh Vemula, Katharina Muelling, and Jean Oh. "Social attention: Modeling attention in human crowds." In 2018 IEEE International Conference on Robotics and Automation (ICRA), pp. 1-7. IEEE, 2018.

Kiaolong Wang, Ross Girshick, Abhinav Gupta, and Kaiming He. "Non-local neural networks." In Proceedings of the EEE Conference on Computer Vision and Pattern Recognition, pp. 7794-7803, 2018.

Yanyu Xu, Zhixin Piao, and Shenghua Gao. "Encoding crowd interaction with deep neural network for pedestrian trajectory prediction." In Proceedings of the IEEE Conference on Computer Vision and Pattern Recognition, pp. 5275-5284, 2018.

Hao Xue, Du Q. Huynh, and Mark Reynolds. "Ss-lstm: A hierarchical lstm model for pedestrian trajectory prediction." In 2018 IEEE Winter Conference on Applications of Computer Vision (WACV), pp. 1186-1194. IEEE, 2018.

Yu Yao, Mingze Xu, Chiho Choi, David J Crandall, Ella M Atkins, and Behzad Dariush. "Egocentric vision-based future vehicle localization for intelligent driving assistance systems." In 2019 International Conference on Robotics and Automation (ICRA), pp. 9711-9717. IEEE, 2019.

Wei Zhan, Liting Sun, Di Wang, Haojie Shi, Aubrey Clausse, Maximilian Naumann, Julius Kummerle, Hendrik Konigshof, Christoph Stiller, Arnaud de La Fortelle, et al. "Interaction dataset: An international, adversarial and cooperative motion dataset in interactive driving scenarios with semantic maps." arXiv preprint arXiv:1910.03088, 2019.

Pu Zhang, Wanli Ouyang, Pengfei Zhang, Jianru Xue, and Nanning Zheng. "Sr-lstm: State refinement for lstm towards pedestrian trajectory prediction." In Proceedings of the IEEE Conference on Computer Vision and Pattern Recognition, pp. 12085-12094, 2019.

Waymo open dataset: An autonomous driving dataset, 2019.

\* cited by examiner

SYSTEM AND METHOD FOR FUTURE FORECASTING USING ACTION PRIORS

CROSS-REFERENCE TO RELATED APPLICATION

This application claims priority to U.S. Provisional Application Ser. No. 62/929,296 filed on Nov. 1, 2019, which is expressly incorporated herein by reference.

BACKGROUND

The ability to forecast future trajectory of traffic agents (pedestrians, vehicles, bicyclists, etc.) is paramount in developing navigation strategies in a range of applications including motion planning and decision making for autonomous and cooperative (shared autonomy) vehicles. To reach a human level ability to forecast behavior is part of a quest for visual intelligence to provide a higher level of autonomous navigation. Some recently reported computation models that predict future trajectories incorporate social normal, semantics, scene context, etc. The majority of these algorithms are developed from stationary camera views in surveillance applications or overhead views from a drone. However, in most cases these models do not incorporate an ability to reasonably estimate an intent of another agent with respect to future actions and future locations of agents based on prior experiences.

BRIEF DESCRIPTION

According to one aspect, a computer-implemented method for future forecasting using action priors that includes receiving image data associated with a surrounding environment of an ego vehicle and dynamic data associated with dynamic operation of the ego vehicle. The computer-implemented method also includes analyzing the image data and detecting actions associated with agents located within the surrounding environment of the ego vehicle and analyzing the dynamic data and processing an ego motion history of the ego vehicle. The computer-implemented method further includes predicting future trajectories of the agents located within the surrounding environment of the ego vehicle and a future ego motion of the ego vehicle within the surrounding environment of the ego vehicle. The future ego motion is based on the future trajectories of the agents and the ego motion history of the ego vehicle.

A system for future forecasting using action priors that includes a memory storing instructions when executed by a processor cause the processor to receive image data associated with a surrounding environment of an ego vehicle and dynamic data associated with dynamic operation of the ego vehicle. The instructions also cause the processor to analyze the image data and detect actions associated with agents located within the surrounding environment of the ego vehicle and analyze the dynamic data and process an ego motion history of the ego vehicle. The instructions further cause the processor to predict future trajectories of the agents located within the surrounding environment of the ego vehicle and a future ego motion of the ego vehicle within the surrounding environment of the ego vehicle. The future ego motion is based on the future trajectories of the agents and the ego motion history of the ego vehicle.

According to yet another aspect, a non-transitory computer readable storage medium storing instructions that when executed by a computer, which includes a processor perform a method, the method that includes receiving image data associated with a surrounding environment of an ego vehicle and dynamic data associated with dynamic operation of the ego vehicle. The method also includes analyzing the image data and detecting actions associated with agents located within the surrounding environment of the ego vehicle and analyzing the dynamic data and processing an ego motion history of the ego vehicle. The computer-implemented method further includes predicting future trajectories of the agents located within the surrounding environment of the ego vehicle and a future ego motion of the ego vehicle within the surrounding environment of the ego vehicle. The future ego motion is based on the future trajectories of the agents and the ego motion history of the ego vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. Computer communication may also include an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Object", as used herein, refers to any items in the roadway and may include proximate vehicles, pedestrians crossing the roadway, other vehicles, obstacles, animals, debris, potholes, etc. Further, an "object" may include most any traffic conditions, road conditions, weather conditions, etc. Examples of objects may include, but are not necessarily limited to other vehicles (e.g., proximate vehicle), buildings, landmarks, obstructions in the roadway, road segments, intersections, etc. Thus, objects may be found, detected, or associated with a path, one or more road segments, etc. along a route on which a ego vehicle is travelling or is projected to travel along.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, drones, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Figure 1:
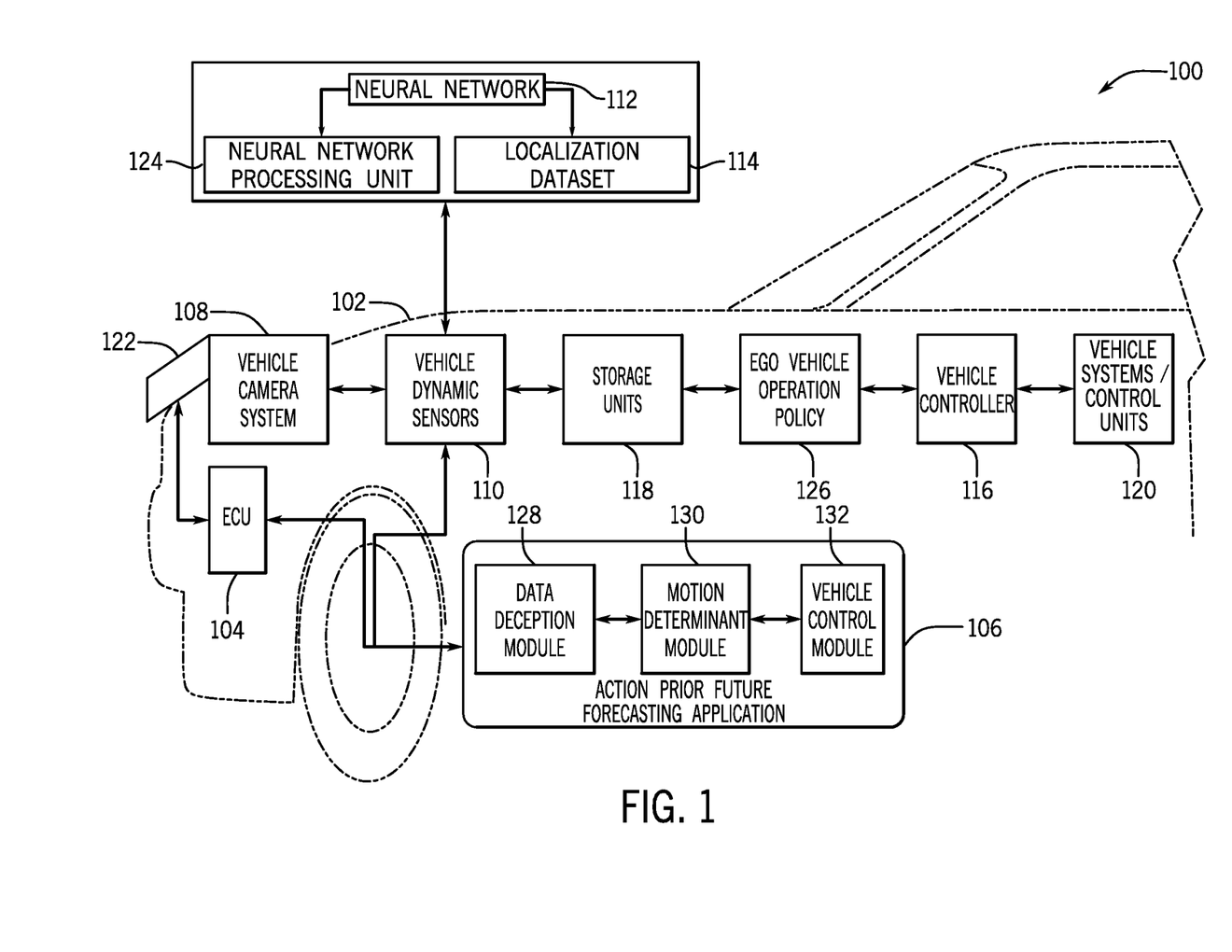
FIG. 1 is a schematic view of the operating environment for implementing systems and methods for future forecasting using action priors according to an exemplary embodiment of the present disclosure.

Referring now to the drawings, wherein the showings are for purposes of illustrating one or more exemplary embodiments and not for purposes of limiting same, FIG. 1 is a schematic view of the operating environment 100 for implementing systems and methods for future forecasting using action priors according to an exemplary embodiment of the present disclosure. The components of the operating environment 100, as well as the components of other systems, hardware architectures, and software architectures discussed herein, may be combined, omitted, or organized into different architectures for various embodiments.

Figure 2:
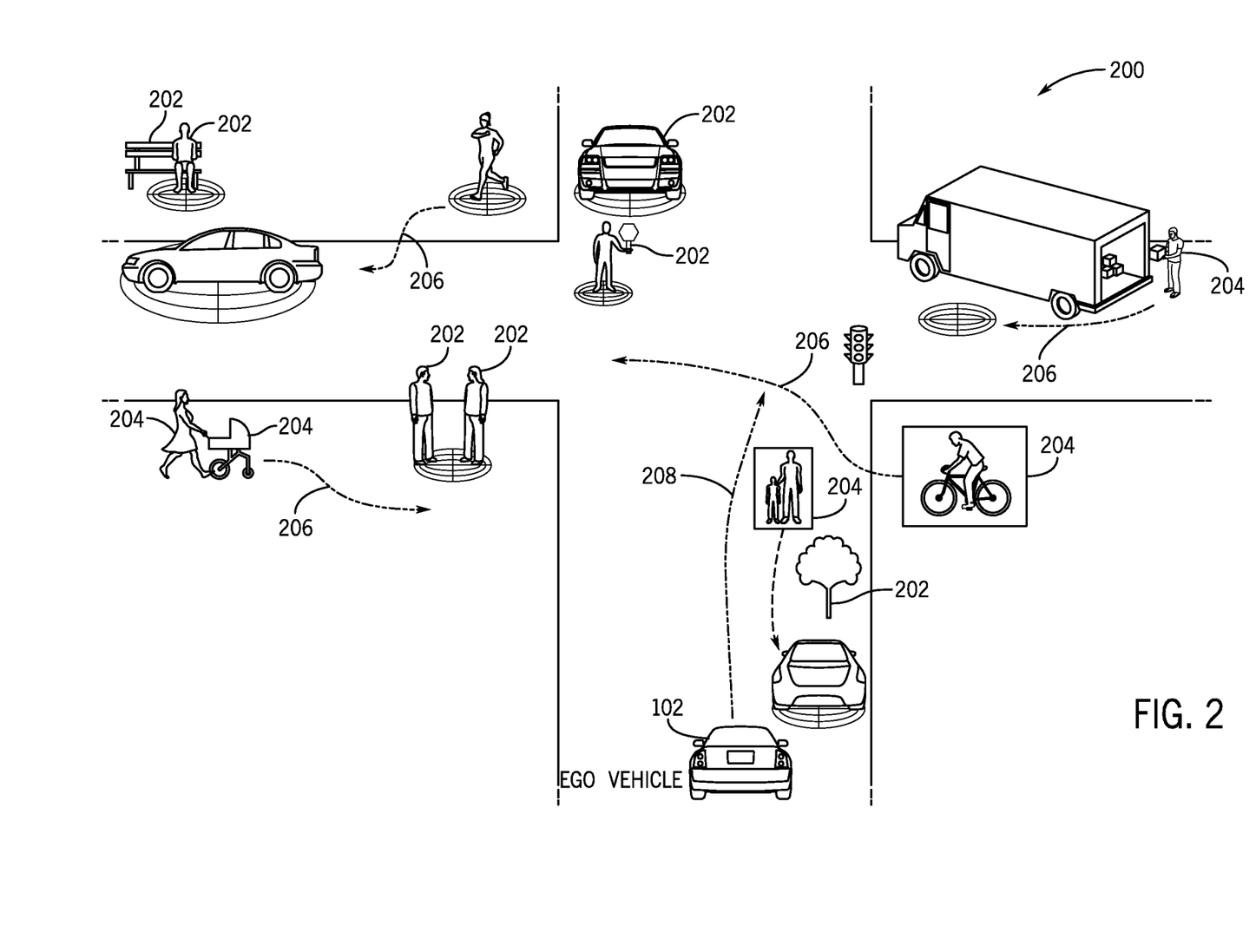
FIG. 2 is an illustrative example of a surrounding environment of an ego vehicle according to an exemplary embodiment of the present disclosure.

Generally, the operating environment 100 includes an ego vehicle 102 with an electronic control unit (ECU) 104 that executes one or more applications, operating systems, vehicle system and subsystem user interfaces, among others. The ECU 104 may also execute an action prior future forecasting application (future forecasting application) 106 that may be configured to analyze prior positions, actions, and context with respect to the ego vehicle 102 and classified agents (e.g., additional road users, vehicles, pedestrians, dynamic objects) that may be located within a surrounding environment of the ego vehicle 102 (as represented in FIG. 2, discussed below). The surrounding environment of the ego vehicle 102 may be defined as a predetermined area located in around (front/sides/behind) the ego vehicle 102 (e.g., road environment in front, sides, and/or behind of the ego vehicle 102) that may be included within the ego vehicle's travel path.

The future forecasting application 106 may be configured to utilize machine learning/deep learning techniques to incorporate the prior positions, actions, and contexts of the agents to simultaneously forecast future trajectories of agents located within the surrounding environment of the ego vehicle 102 at one or more future time steps (e.g., t+1, t+2, t+n). As discussed below, the future forecasting application 106 may output a predicted future ego motion of the ego vehicle 102 at one or more future time steps that may be based on past and current ego-motions of the ego vehicle 102 and the forecasted future trajectories of agents. The future ego motion of the ego vehicle 102 may be used to autonomously control the ego vehicle 102 to operate in a manner to smoothly navigate within the surrounding environment of the ego vehicle 102.

In an exemplary embodiment, the future forecasting application 106 may be configured to communicate with a neural network 112 to analyze the image data received from a vehicle camera system 108 of the ego vehicle 102. The neural network 112 may utilize a localization dataset 114 to annotate actions associated with the agents located within the surrounding environment of the ego vehicle 102. Such annotations may be utilized to model pairwise interactions between agents to complete future traffic participant localization associated with each of the agents. Upon completing the future traffic participant localization associated with each of the agents, the neural network 112 may be configured to predict future trajectories of each of the agents based on the future traffic participant localization.

The neural network 112 may also be configured to receive real-time vehicle dynamic data for one or more timeframes from vehicle dynamic sensors 110 of the ego vehicle 102. As discussed below, based on the vehicle dynamic data during one or more prior periods of time and a current period of time, the neural network 112 may be configured to process an ego motion history that may include vehicle dynamic parameters of the ego vehicle 102 for the predetermined period of time. The ego motion history may be analyzed in addition to the predicted future trajectories of the agents to predict and output future ego motion of the ego vehicle 102 at one or more future time steps to the future forecasting application 106.

As shown in the illustrative example of FIG. 2, the surrounding environment 200 of the ego vehicle 102 may include stationary objects that may include, but may not be limited to, stationary individuals, parked vehicles, seated individuals, and the like. Additionally, the surrounding environment 200 of the ego vehicle 102 may include dynamic objects that may include, but may not be limited to, vehicles that are traveling (e.g., moving) within the surrounding environment 200, pedestrians that traveling within the surrounding environment 200, bicyclists that are traveling within the surrounding environment 200, and/or additional wheeled vehicles that are traveling within the surrounding environment 200. As discussed in more detail below, the application 106 may electronically communicate with the neural network 112 to analyze the egocentric views of the surrounding environment of the ego vehicle 102 from the perspective of the ego vehicle 102 to compute bounding boxes around the numerous objects.

In one embodiment, the neural network 112 may be configured to execute image logic to respectively identify the stationary objects located within the surrounding environment 200 of the ego vehicle 102. Upon identifying the stationary objects, the neural network 112 may be configured to classify the identified stationary objects as static objects 202. Additionally, the neural network 112 may be utilized to execute the image logic to respectively identify the dynamic objects that may be located within the surrounding environment 200 of the ego vehicle 102. Upon identifying the dynamic objects, the neural network 112 may be configured to classify the dynamic objects as agents 204 that may be further analyzed to detect and annotate atomic, contextual, and/or additional types of actions being conducted by the agents 204. As discussed below, the neural network 112 may be configured to predict future bounding boxes associated with the agents 204 to thereby output predicted future trajectories 206 of the agents 204 based on detected atomic, contextual, and/or additional types of actions of each of the agents 204.

As discussed, the future forecasting application 106 may also be configured to utilize the neural network 112 to output instructions associated with the predicted future ego motion 208 of the ego vehicle 102. In an exemplary embodiment, the future ego motion 208 may apply to a future trajectory of the ego vehicle 102, a speed of the ego vehicle 102, a braking rate of the ego vehicle 102, a steering angle of a steering of the ego vehicle 102, and additional vehicle dynamic parameters that may be applied to autonomously operate the ego vehicle 102 to smoothly navigate through the surrounding environment 200 of the ego vehicle 102.

The future forecasting application 106 may store and execute the vehicle dynamic parameters associated with the predicted future ego motion to autonomously control the ego vehicle 102 to smoothly navigate through the surrounding environment 200 of the ego vehicle 102 such that the future ego motion 208 of the ego vehicle 102 does not overlap with the predicted future trajectories 206 of the agents 204. In particular, the vehicle dynamic parameters may be executed by the application 106 to communicate one or more command instructions to a vehicle controller 116 of the ego vehicle 102 to autonomously control the ego vehicle 102 based on the predicted ego motion of the ego vehicle 102.

With continued reference to FIG. 1, in an exemplary embodiment, the ECU 104 may be configured to operably control the plurality of components of the ego vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 118 of the ego vehicle 102 to execute the one or more applications, operating systems, ego vehicle system and subsystem user interfaces, and the like that are stored within the storage unit 118. As discussed below, the storage unit 118 may be configured to store the neural network 112 and one or more components of the neural network 112.

In one embodiment, the ECU 104 may operably control the vehicle controller 116 to process and execute autonomous dynamic parameters based on the one or more commands received from the application 106 that may be based on the predicted future ego motion 208 of the ego vehicle 102. Additionally or alternatively, the ECU 104 may operably control the vehicle controller 116 to process and execute autonomous dynamic parameters based on one or more intended destinations of the ego vehicle 102, one or more static objects 202 located within the surrounding environment 200 of the ego vehicle 102 (e.g., located at/near a perspective path of the ego vehicle 102), and/or one or more external factors that may include, but may not be limited to, a lane in which the ego vehicle 102 is traveling, status of traffic signals, traffic patterns, traffic regulations, etc.

In particular, the ECU 104 may communicate with the vehicle controller 116 to execute autonomous driving commands to operate the ego vehicle 102 to be fully autonomously driven or semi-autonomously driven in a particular manner. As discussed below, based on one or more executable command instructions that may be communicated by the application 106, the vehicle controller 116 may be configured to autonomously control the ego vehicle 102 to operate in a manner based on the future ego motion 208 that is output by the neural network 112. For example, the application 106 may send commands to the vehicle controller 116 to ensure that the ego vehicle 102 is autonomously operated to complete smooth acceleration, braking, and/or steering to smoothly navigate within the surrounding environment 200 of the ego vehicle 102 to avoid any potential overlapping of paths between the future ego motion 208 of the ego vehicle 102 and the predicted future trajectories 206 of the agents 204.

In one or more embodiments, the vehicle controller 116 may autonomously control the operation of the ego vehicle 102 by providing one or more commands to one or more vehicle systems/control units 120 to provide full autonomous or semi-autonomous control of the ego vehicle 102. Such autonomous control of the ego vehicle 102 may be provided by sending one or more commands to control one or more of the vehicle systems/control units 120 to operate (e.g., drive) the ego vehicle 102 during one or more circumstances (e.g., when providing driver assist controls), and/or to fully control driving of the ego vehicle 102 during an entire trip of the ego vehicle 102.

The one or more commands may be provided to one or more vehicle systems/control units 120 that include, but are not limited to an engine control unit, a braking control unit, a transmission control unit, a steering control unit, and the like to control the ego vehicle 102 to be autonomously driven based on the future ego motion 208 of the ego vehicle 102 as output by the neural network 112 to the future forecasting application 106.

In an exemplary embodiment, the vehicle camera system 108 may include one or more cameras 122 that are positioned at one or more areas of the surrounding environment 200 of the ego vehicle 102. The one or more cameras 122 of the vehicle camera system 108 may be disposed at external front portions of the ego vehicle 102, including, but not limited to different portions of the vehicle dashboard, vehicle bumper, vehicle front lighting units, vehicle fenders, and the windshield. In one embodiment, the one or more cameras 122 may be configured as RGB cameras that may capture RGB bands that are configured to capture rich information about object appearance, as well as relationships and interactions between the ego vehicle 102, agents 204, and/or static objects 202 located within the surrounding environment 200 of the ego vehicle 102. The one or more cameras 122 may be configured to capture the images (e.g., images, videos) of the surrounding environment 200 of the ego vehicle 102 in one or more resolutions. For example, the one or more cameras 122 may be configured to capture video clips of the egocentric view of the surrounding environment 200 of the ego vehicle 102 with 1920×1200 resolutions and 10 fps.

As discussed, image data may be provided by the vehicle camera system 108 to the future forecasting application 106 to be further evaluated and processed based on utilization of the neural network 112. In some embodiments, the neural network 112 may be configured to execute the image logic to perform feature extraction extract on the image(s). The feature extraction may include the extraction of one or more spatial-temporal features and may pertain to object and scene recognition. As discussed, the image logic may also be executed to determine one or more static objects and one or more dynamic objects that may be located within the surrounding environment 200 of the ego vehicle 102. In some embodiments, the image logic may be executed to determine one or more sets of image coordinates associated with one or more static objects and/or one or more dynamic objects. Furthermore, the image logic may be executed to identify and/or determine one or more image coordinates of roadway attributes (e.g., lane markings, off-ramps, curbs), and road side objects (e.g., traffic light, stop sign).

In one or more embodiments, the vehicle systems/control units 120 may be operably connected to the vehicle dynamic sensors 110 of the ego vehicle 102. The vehicle dynamic sensors 110 may be configured to receive inputs from one or more ego vehicle systems, sub-systems, control systems, and the like. In one embodiment, the vehicle dynamic sensors 110 may be included as part of a Controller Area Network (CAN) of the ego vehicle 102 and may be configured to provide vehicle dynamic data to the ECU 104 to be utilized for one or more ego vehicle systems, sub-systems, control systems, and the like. The vehicle dynamic sensors 110 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the vehicle dynamic sensors 110 may provide one or more values (e.g., numeric levels) that are associated with the real-time ego motion of the ego vehicle 102 as one or more driving maneuvers are conducted and/or as the ego vehicle 102 is controlled to be autonomously driven. As described below, the vehicle dynamic data that represents the ego motion of the ego vehicle 102 may be provided at one or more time steps (e.g., one or more prior time steps to a current time step) to be processed as ego motion history. In particular, vehicle dynamic parameters derived from the vehicle dynamic data over a predetermined period of time (e.g., one or more prior time steps to a current time step) may be analyzed in addition to the predicted future trajectories 206 of the agents 204 to predict and output the future ego motion 208 of the ego vehicle 102.

In one or more embodiments, the storage unit 118 of the ego vehicle 102 may be configured to store one or more executable files associated with one or more operating systems, applications, associated operating system data, application data, ego vehicle system and subsystem user interface data, and the like that are executed by the ECU 104. In one or more embodiments, the storage unit 118 may be accessed by the future forecasting application 106 to store the processed ego motion history associated with the past and real-time ego motion of the ego vehicle 102.

In an exemplary embodiment, the storage unit 118 may be configured to store one or more components of the neural network 112. The neural network 112 may include a neural network processing unit 124 that may provide processing capabilities to be configured to utilize machine learning/deep learning to provide artificial intelligence capabilities that may be utilized to output data to the future forecasting application 106 and maintain a localization dataset 114. The neural network processing unit 124 may process information that is provided as inputs and may utilize the storage unit 118 to store and access stored future localization data to provide various functions, that may include, but may not be limited to, object classification, feature recognition, computer vision, speed recognition, machine translation, autonomous driving commands, and the like.

The neural network 112 may be configured as a multi-stream Recurrent Neural Network (RNN) and may include an encoder-decoder structure (shown in FIG. 4, as discussed below) that includes a plurality of fully connected layers. Alternatively, the neural network 112 may be configured as a convolutional neural network (CNN). The neural network 112 may utilize machine learning/deep learning to provide artificial intelligence capabilities. For example, the neural network 112 may utilize machine learning/deep learning to analyze image data to identify dynamic objects and classify them as agents 204, to annotate actions associated with the agents 204, and to predict future bounding boxes associated with respective future trajectories of each of the agents 204.

As discussed below, the neural network 112 may be configured to access and analyze the localization dataset 114 to detect and annotate atomic, contextual, and/or additional types of actions associated with each of the agents 204 located within the surrounding environment 200 of the ego vehicle 102. The localization dataset 114 may be pre-trained based on previously recorded video models that may be associated with various types of participant agents (e.g., additional vehicles, pedestrians, bicyclists, etc.) that may be located in various types of traffic environments. For example, the localization dataset 114 may be based on an extraction of hundreds/thousands of short egocentric video clips that include images of traffic environments that include participant agents. Each of the video clips may be between ten-twenty seconds in duration, with an image side width: 1920 px, height: 1200 px and annotated with actions being conducted by each of the participant agents located within the various types of traffic environments captured within the clips. The characteristics of the clips included within the localization dataset 114 may include scenes that exhibit a variety of participant agent actions and interactions.

Figure 3:
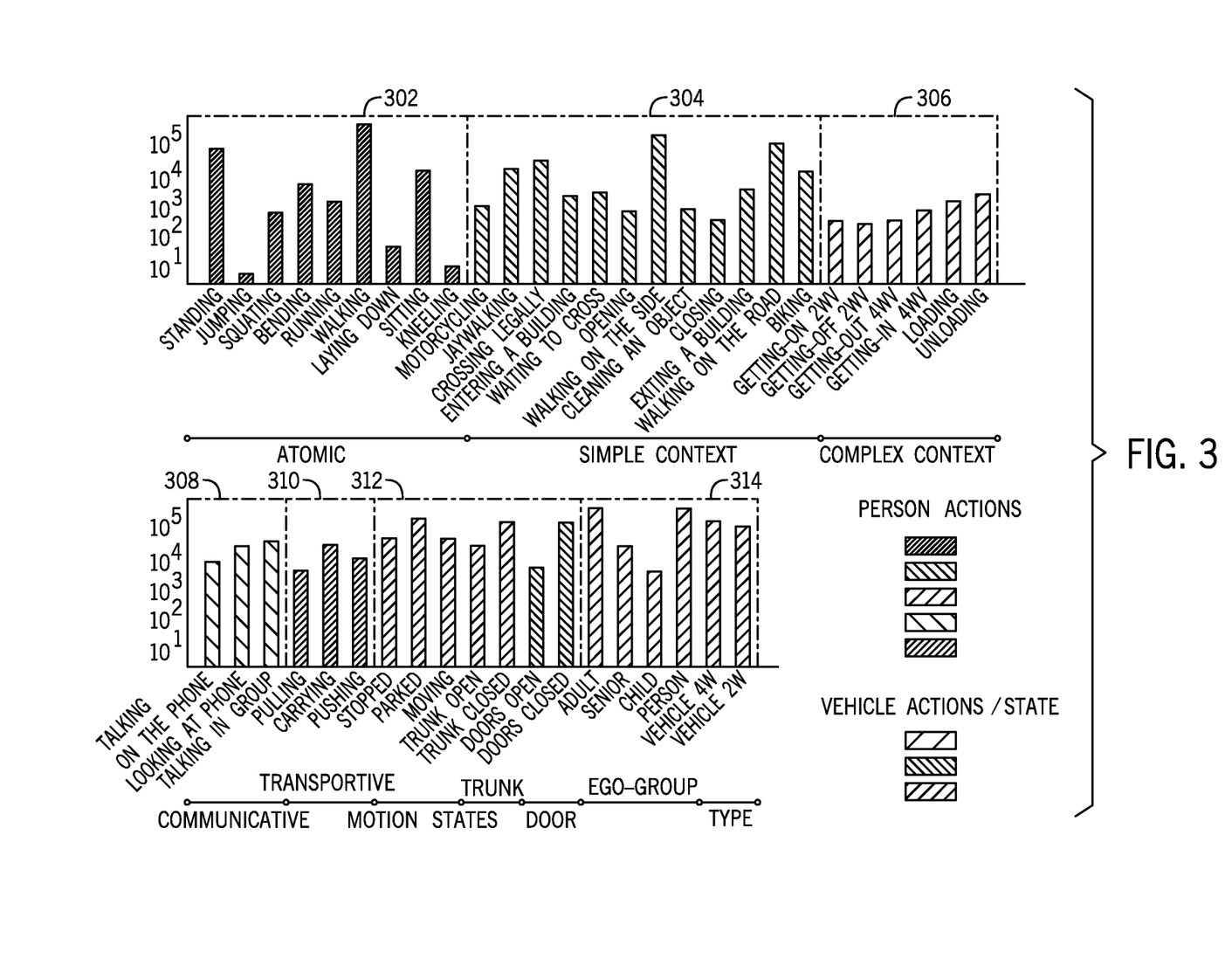
FIG. 3 is an illustrative example of a taxonomy and distribution of action labels according to an exemplary embodiment of the present disclosure.

As shown in FIG. 3, an illustrative example of a taxonomy and distribution of action labels, a total number of frames may be annotated with action labels that may be associated with various types of participant agents which may include, but may not be limited to vehicles, pedestrians, bicyclists, and the like. In one configuration, to build the localization dataset 114 each participant agent in each frame may be localized within one or more respective video clips using a bounding box.

In an exemplary embodiment, the action labels of the localization dataset 114 may include a plurality of mutually exclusive pedestrian action sets 302-310 and one or more vehicle action sets 312 organized hierarchically. The actions sets 303-312 that are shown in FIG. 3 are shown for illustrative/exemplary purposes. Accordingly, it is to be appreciated that the localization dataset 114 may include additional and/or alternative pedestrian action sets and/or vehicle actions sets that may be associated with atomic, contextual, and/or additional types of actions being conducted by the pedestrians, vehicles, and/or additional types of participant agents.

As shown in the illustrative example of FIG. 3, a first pedestrian action set 302 may include a plurality of atomic whole body actions/postures that describe primitive action poses associated with pedestrian participant agents such as sitting, standing, bending, etc. A second pedestrian action set 304 may include a plurality of actions that involve single atomic actions with simple scene context such as jay-walking, waiting to cross, etc. A third pedestrian action set 306 may include a plurality of complex contextual actions that may involve a sequence of atomic actions with higher contextual understanding, such as getting in/out of a four-wheel vehicle, loading/unloading, etc.

The localization dataset 114 may also include a fourth pedestrian action set 308 that includes a plurality of trans-portive actions that may describe the act of manually transporting an object by carting, pulling, or pushing. Additionally, a fifth pedestrian action set 310 may include a plurality of communicative actions observed in traffic scenes such as talking on a phone, looking at a phone, or talking in groups. In one embodiment, the localization dataset 114 may additionally include one or more vehicle action sets 312 that may be associated with a motion status of vehicle participant agents, trunk/door status of vehicle participant agents, and/or additional vehicle maneuvers of vehicle participant agents (not shown) (e.g., turning right, turning left, merging, etc.). Additionally, the localization dataset 114 may include labels 314 that may be annotated with respect to a type of participant agent (e.g., pedestrian, four-wheeled vehicle, two-wheeled vehicle). Labels may also be annotated with respect to age groups for pedestrian participant agents (e.g., child, adult, senior).

It is to be appreciated that the localization dataset 114 may include additional and/or alternative atomic, contextual, and/or additional types of actions being conducted by the pedestrian participant agents, vehicle participant agents, and/or additional types of participant agents that are pre-trained based on scenes included within video clips. As discussed below, the localization dataset 114 may be accessed and utilized by the neural network 112 to annotate real-time actions that are associated with the agents 204 located within the surrounding environment 200 of the ego vehicle 102. Such actions may be utilized as priors that may be analyzed to predict the future trajectories 206 of the agents 204.

In an exemplary embodiment, the storage unit 118 may also be configured to store an ego vehicle operation policy 126. The ego vehicle operation policy 126 may be processed and built by the future forecasting application 106 to include dynamic parameters that may be implemented to autonomously control the operation of the ego vehicle 102 within the surrounding environment of the ego vehicle 102.

In one embodiment, upon the neural network 112 predicting the future trajectories 206 of the agents 204 and the future ego motion 208 of the ego vehicle 102, the future forecasting application 106 may be configured to update the ego vehicle operation policy 126 with vehicle dynamic parameters that may be based on the future ego motion 208 of the ego vehicle 102, data associated with annotated actions associated with each of the agents 204, and the predicted future trajectories 206 of each of the agents 204. The ego vehicle operation policy 126 may also be updated with data associated with the surrounding environment 200 of the ego vehicle 102 including, but not limited to, locations of static objects 202 and additional environmental attributes (e.g., curvature of roadway, configuration of intersections, and the like). As discussed below, the ego vehicle operation policy 126 may be accessed at one or more future points in time to retrieve dynamic parameters that may correspond to the predicted future ego motion of the ego vehicle 102 to autonomously control the operation of the ego vehicle 102 to smoothly navigate a current environment of the ego vehicle 102 based on action priors.

In some embodiments, the future forecasting application 106 may access and analyze the ego vehicle operation policy 126 to provide motion planning capabilities while executing autonomous driving commands that may be provided to autonomously control the ego vehicle 102 in various traffic environments that may be similar (e.g., in one or more manners) to the surrounding environment 200 of the ego vehicle 102 to preemptively adapt to predicted future locations, positions, scales, depths, and trajectories of additional vehicles and pedestrians located within such environments.

II. The Action Prior Future Forecasting Application and Related Methods

Components of the future forecasting application 106 and components of the neural network 112 will now be described according to an exemplary embodiment and with reference to FIG. 1. In an exemplary embodiment, the future forecasting application 106 may be stored on the storage unit 118 and executed by the ECU 104 of the ego vehicle 102. In another embodiment, the future forecasting application 106 may be stored on an externally hosted computing infrastructure (not shown) and may be accessed by a telematics control unit (not shown) of the ego vehicle 102 to be executed by the ECU 104 of the ego vehicle 102.

With continued reference to FIG. 1, the general functionality of the future forecasting application 106 will now be discussed. In an exemplary embodiment, the future forecasting application 106 may include a plurality of modules 128-132 that may be configured to communicate with one or more components of the neural network 112 to predict the future motion of agents 204 and output the future ego motion 208 of the ego vehicle 102 in an egocentric view by using actions as a prior. In one or more embodiments, the plurality of modules 128-132 of the future forecasting application 106 may include a data reception module 128, a motion prediction module 130, and a vehicle control module 132. However, it is appreciated that the future forecasting application 106 may include one or more additional modules and/or sub-modules that are included in lieu of the modules 128-132.

Figure 4:
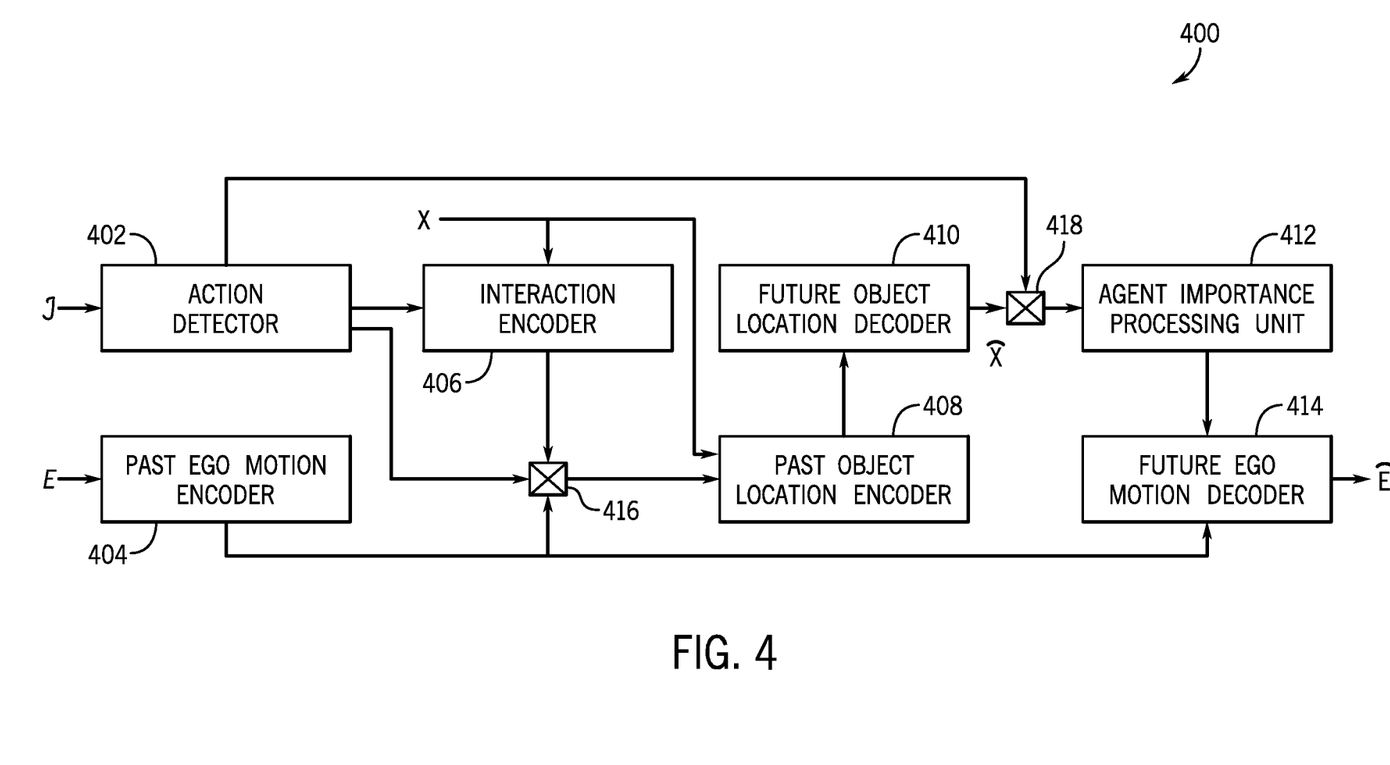
FIG. 4 is a schematic overview and process flow of the encoder-decoder structure of a neural network according to an exemplary embodiment of the present disclosure.

FIG. 4 is a schematic overview and process flow of the encoder-decoder structure 400 of the neural network 112 according to an exemplary embodiment of the present disclosure. As shown, the encoder-decoder structure 400 of the neural network 112 may include detectors, encoders, decoders, and processing units that may be configured to utilize machine learning/deep learning to provide artificial intelligence capabilities that may be utilized to analyze inputted image data and vehicle dynamic data and to output data in the form of the predicted future ego motion 208 of the ego vehicle 102. In an exemplary embodiment, the encoder-decoder structure 400 may include an action detector 402, a past ego motion encoder 404, an interaction encoder 406, a past object location encoder 408, a future object location decoder 410, an agent importance processing unit 412, and a future ego motion decoder 414.

The detectors, encoders, decoders, and processing units of the encoder-decoder structure 400 may be configured to analyze the past and current ego motion of the ego vehicle 102, analyze the egocentric views of the surrounding environment 200 of the ego vehicle 102 to classify agents 204, annotate actions associated with the agents 204, predict bounding boxes that include the agents 204, predict future trajectories 206 associated with the agents 204 based on the predicted bounding boxes, and predict and output the future ego motion 208 of the ego vehicle 102 to the future forecasting application 106. The functionality of each of the detectors, encoders, decoders, and processing units will now be discussed in more detail with respects to the methods executed by the future forecasting application 106.

Figure 5:
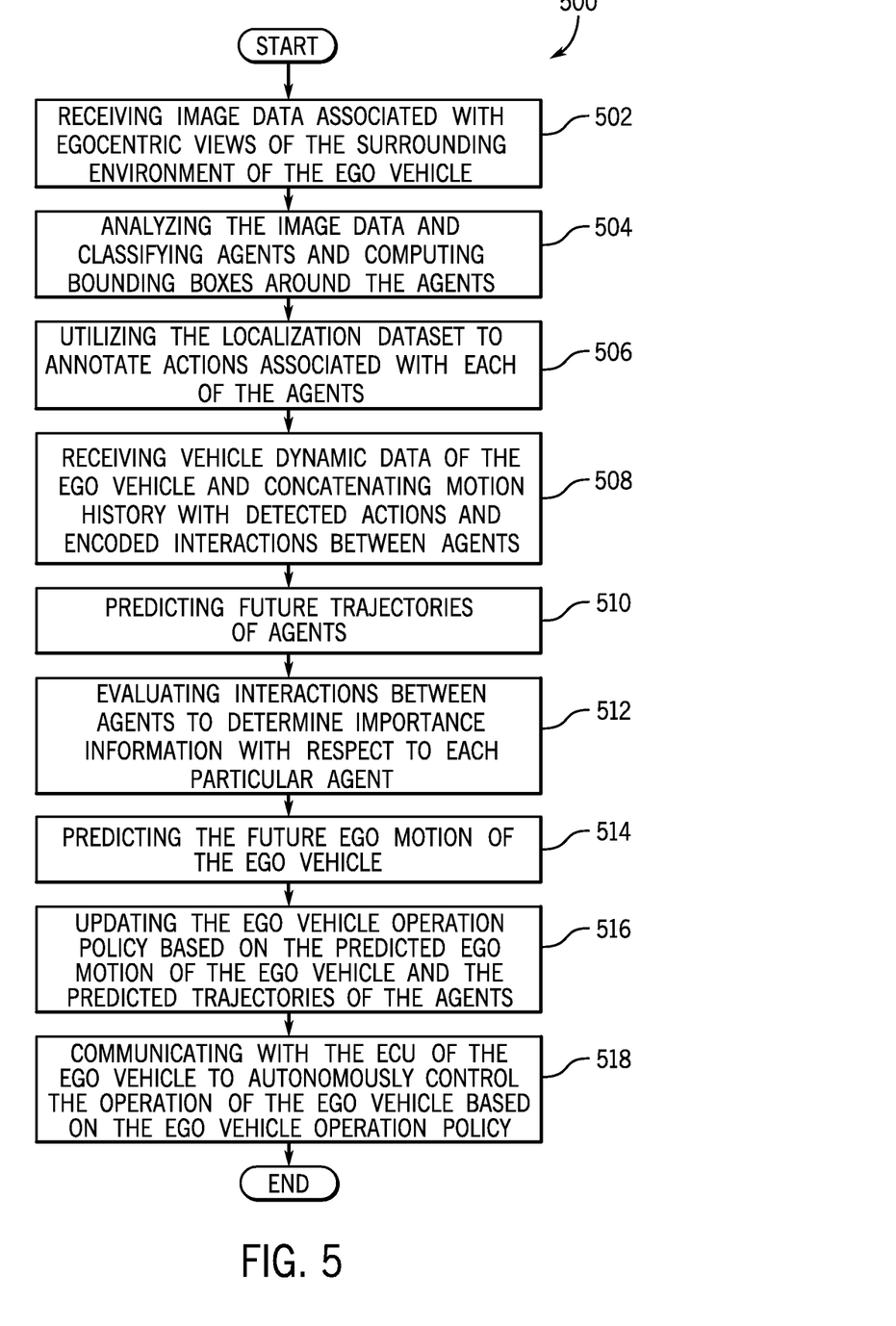
FIG. 5 is a process flow diagram of a method for using action priors to predict the future trajectories of agents located within the surrounding environment of the ego vehicle and predicting the future ego motion of the ego vehicle according to an exemplary embodiment of the present disclosure.

FIG. 5 is a process flow diagram of a method 500 for using action priors to predict the future trajectories of the agents 204 located within the surrounding environment 200 of the ego vehicle 102 and predicting the future ego motion 208 of the ego vehicle 102 according to an exemplary embodiment of the present disclosure. FIG. 5 will be described with reference to the components and examples of FIGS. 1-4 though it is to be appreciated that the method 500 of FIG. 5 may be used with other systems/components and in additional exemplary scenarios. The method 500 may begin at block 502, wherein the method 500 may include receiving image data associated with egocentric views of the surrounding environment 200 of the ego vehicle 102.

In an exemplary embodiment, the data reception module 128 of the future forecasting application 106 may be configured to communicate with the vehicle camera system 108 to receive image data. The image data may be associated with egocentric views of the surrounding environment 200 of the ego vehicle 102 as captured by the one or more cameras 122 of the vehicle camera system 108. In particular, the image data may pertain to one or more RGB ego centric images/video of the surrounding environment 200 of the ego vehicle 102 that may include various types of objects. In some embodiments, the data reception module 128 may be configured to package and store the image data on the storage unit 118 to be evaluated at one or more points in time.

The method 500 may proceed to block 504, wherein the method 500 may include analyzing the image data, classifying agents 204, and computing bounding boxes around the agents 204. In one or more embodiments, upon receiving the image data from the vehicle camera system 108, the data reception module 128 may be configured to communicate with the neural network processing unit 124 to input the image data to the action detector 402 of the neural network 112. As shown in FIG. 4, the image data $\mathcal{J}$ may be inputted to the action detector 402 to be electronically analyzed.

In an exemplary embodiment, upon receiving the inputted image data, the action detector 402 may be configured to execute image logic to analyze the image data. In particular, the action detector 402 may execute the image logic to respectively identify one or more stationary objects located within the surrounding environment 200 of the ego vehicle 102 and may classify the one or more stationary objects as static objects 202. Additionally, the action detector 402 may be utilized to execute the image logic to respectively identify one or more dynamic objects that may be located within the surrounding environment 200 of the ego vehicle 102. Upon identifying the one or more dynamic objects, the action detector 402 may be configured to classify the one or more dynamic objects as agents 204 that may be further analyzed to detect and annotate atomic, contextual, and/or additional types of actions that may be associated with the agents 204 (e.g., that may be being conducted by the agents 204).

In one or more embodiments, upon classifying the agents 204 located within the surrounding environment of the ego vehicle 102, the action detector 402 may be configured to compute bounding boxes around each of the agents 204 within a computed image scene of the surrounding environment 200 of the ego vehicle 102.

The method 500 may proceed to block 506, wherein the method 500 includes utilizing the localization dataset 114 to annotate actions associated with each of the agents 204. In one embodiment, the action detector 402 may be configured to analyze each of the computed bounding boxes within the image scene by obtaining a sequence of image patches $\mathcal{J}_{t=1}^{i}:T_{obs}$ from each bounding box, $x^i=\{c_u, c_v, l_u, l_v\}$ computed for each of the agents i at each past time step from 1 to $T_{obs}$, where ($c_u$, $c_v$) and ($l_u$, $l_v$) represent the center and the dimension of each bounding box, respectively. The action detector 402 may thereby access the localization dataset 114 to analyze the action sets 302-312 to annotate actions associated with each of the agents 204 included within each of the computed bounding boxes. Since each of the actions sets 302-312 may be mutually exclusive, the outputs associated with each of the annotated actions of each of the agents 204 are independent to one another as follows:

$$P(y_m, \ldots, y_n \mid f(\mathcal{J})) = \prod_{i=m}^{n} p(y_i \mid f(\mathcal{J}))$$

where $y_i$ is the output label of $i^{th}$ action set and f is an action detection model. A multi-task loss is defined as:

$$\mathcal{L}_a = \sum_{i=m}^{n} \frac{ce(\widehat{cls}_i, cls_{i})}{\sigma_i^2} + \log \sigma_i$$

where ce is a cross entropy loss between predicted actions $\widehat{cls}_i$ and ground truth $cls_i$ for each label i=m:n. Accordingly, action label annotation may be completed separately for the pedestrian agents and vehicle agents that may be located within the surrounding environment 200 of the ego vehicle 102 as they have different action sets, as discussed above with respect to FIG. 3. Each given bounding box $x_t^i = \{c_u, c_v, l_u, l_v\}_t$ associated with each of the agents 204 is thereby concatenated with the multi-label action vector $a_t^i$.

Upon annotating action labels associated with each of the agents 204 located within the surrounding environment 200 of the ego vehicle 102, the action detector 402 may communicate data pertaining to annotated action labels to the motion prediction module 130 of the future forecasting application 106. The motion prediction module 130 may be configured to access the storage unit 118 of the ego vehicle 102 and may thereby store the annotated action labels associated with each of the agents 204 upon the storage unit 118. In some configurations, the stored annotated action labels may be accessed by the motion prediction module 130 to further train the localization dataset 114 to further build the dataset with additional image clips that may pertain to particular types of action labels as derived from corresponding image data as provided by the vehicle camera system 108.

The method 500 may proceed to block 508, wherein the method 500 may include receiving vehicle dynamic data of the ego vehicle 102 and concatenating the ego motion history with detected actions and encoded actions between agents 204. In an exemplary embodiment, the data reception module 128 may be configured to communicate with the vehicle dynamic sensors 110 of the ego vehicle 102 to receive real-time vehicle dynamic data that is associated with a plurality of ego vehicle dynamic parameters.

The real-time vehicle dynamic data may include, but may not be limited to data that pertains to a current position of the ego vehicle 102, a current heading of the ego vehicle 102, a current velocity of the ego vehicle 102, a current steering angle of a steering of the ego vehicle 102, a current steering speed associated with the steering of the ego vehicle 102, a current throttle angle of a throttle of the ego vehicle 102, a current acceleration of the ego vehicle 102, a current yaw rate of the ego vehicle 102, a current brake force associated with the brakes of the ego vehicle 102, a current transmission gear of the ego vehicle 102, a current geo-location of the ego vehicle 102, and the like.

In one embodiment, upon receiving the vehicle dynamic data from the vehicle dynamic sensors 110, the data reception module 128 may be configured to communicate the vehicle dynamic data to the motion prediction module 130. In one embodiment, the motion prediction module 130 may be configured to store the vehicle dynamic data (received at each time stamp) as a current ego motion of the ego vehicle 102 upon the storage unit 118 of the ego vehicle 102. In an exemplary embodiment, the motion prediction module 130 may be configured to retrieve prior ego motions stored at one or more prior time stamps (e.g., t−1, t−2) and may aggregate the retrieved prior ego motions stored at the one or more prior time stamps with the real-time vehicle dynamic data to process an ego motion history E that may include vehicle dynamic parameters over a predetermined period of time.

Upon processing the ego motion history E, the motion prediction module 130 may input the ego motion history E to the past ego motion encoder 404 of the neural network 112. In one embodiment, the past ego motion encoder 404 may be configured as gated recurrent unit (GRU) encoders and may take $e_t=(\alpha_t, \omega_t)$ as an input and embed the ego motion history E of ego vehicle 102 using the GRU. Accordingly, the past ego motion encoder 404 may encode the ego motion history associated with the ego vehicle 102 using the GRU.

In an exemplary embodiment, the interaction encoder 406 may be configured to model the interactions using the past locations of agents 204 conditioned on their annotated actions. The modeling of interactions using the past locations of agents 204 may enable understanding of the contextual meaning of motion behavior of the agents 204 within the surrounding environment 200 of the ego vehicle 102 since interactions using the past locations of agents 204 may be conditioned on their actions.

In particular, the interaction encoder 406 of the neural network 112 may receive annotated labels associated with the actions of each of the agents 204 as annotated by the action detector 402 as inputs. The interaction encoder 406 may additionally be configured to receive X as an input trajectory of other agents with respect to a particular target agent i. In other words, a trajectory of each of the agents 204 may be inputted as one of the agents 204 is determined as a target agent i to be evaluated with respect to an interaction with the additional agents located within the surrounding environment 200 of the ego vehicle 102. It is to be appreciated that each of the agents 204 may be concurrently evaluated as a target agent i with respect to the additional agents located within the surrounding environment 200 of the ego vehicle 102.

In one configuration, resulting interactions $v_t^{ij}$ between the agents 204 are evaluated through the dynamic RNN with GRUs to leave important information with respect to the target agent, $h_t^{i(j+1)}=\text{GRU}(v_t^{ij}, h_t^{ij}, W_{INT})$, where $W_{INT}$ are weight parameters. The messages of instant interaction may be passed with each agent at time t, which enables the neural network 112 to determine each agent's potential influence at each moment. The hidden states may thereby be aggregated by the interaction encoder 406 to generate interaction features $$\psi_t^i = \frac{1}{n}\sum h_t^{ij}$$

for the target agent i, computed from all other agents in the scene at time t.

In an exemplary embodiment, encoded data from the past ego motion encoder 404, the interaction encoder 406, and the annotated action labels associated with each of the agents 204 located within the surrounding environment 200 of the ego vehicle 102 (as output by the action detector 402) may be concatenated into ego motion agent action interaction data 416.

Pair-wise interactions between the target agent i and all other agents j are modeled through a multi-layer perception (MLP), $$v_t^{ij}=\Phi_r(x_t^i\text{Reject}a_t^i\text{Reject}x_t^j\text{Reject}a_t^j)$$

where Reject is a concatenation operator. In an exemplary embodiment, the encoded output of the past ego motion encoder 404 may be inputted to the past object location encoder 408 of the neural network 112 in addition to ego motion agent action interaction data 416 associated with the outputs of the action detector 402, the past ego motion encoder 404, and the interaction encoder 406. In particular, the input to the past ego motion encoder 404 may be configured as a bounding box for each of the agents where $y_i$ is the output label of $i^{th}$ action set and f is the action detection model.

The method 500 may proceed to block 510, wherein the method 500 may include predicting future trajectories of agents 204. In one or more embodiments, a multi-task loss is defined as $x^i$ of the target agent i at each past time step. The embedding $\Phi(x_t^i)$ is used for the GRU. The output hidden state $h_t^p$ of the past object location encoder 408 is updated by $\hat{h}_t^p=\Phi(H_t^{xi}\text{Reject}h_t^p)$, where $H_t^{xi}=\Phi_r(a_{t_{[<|\text{BEGIN INITIAL}|>}}^i)\text{Reject}\psi_t^i\text{Reject}\Phi_r(h_t^e))$ is concatenated information. $h_t^p$ is used as a hidden state input to the GRU by $h_{t+1}^p=\text{GRU}(\hat{h}_t^p, \Phi(x_t^i); W_{POL})$, where $W_{POL}$ are weight parameters.

In an exemplary embodiment, a final hidden state of the hidden state input to the GRU is used as an initial hidden state input of the future object location decoder 410. In one configuration, the future object location decoder 410 may be GRU based and may decode future bounding boxes of the target agent i (e.g., for each of the agents 204 as target agents concurrently). The future bounding boxes may be decoded at each time step to output a ten-dimensional vector where the first five values are the center $\mu_c=(c_u, c_v)$ of the future bounding boxes, the variance $\sigma_c=(\sigma_{cu}, \sigma_{cv})$ of the future bounding boxes, and its correlation $\rho_i$. In one configuration, the future object location decoder 410 may use two bivariate Gaussians for bounding box centers and dimensions to ensure that they may be independently sampled.

A negative log-likelihood loss function may be used as $$\mathcal{L}_o = -\frac{1}{T}\sum_{T_{obs}+1}^{T_{pred}} \log p(c \mid \mu_c^t, \sigma_c^t, \rho_c)p(l \mid \mu_l^t, \sigma_l^t, \rho_l).$$

Accordingly, based on the future bounding box positions associated with each of the agents 204 located within the surrounding environment 200 of the ego vehicle 102 (e.g., evaluated as targeted agents), the future object location decoder 410 may output respective predicted future trajectories 206 associated with each of the agents 204 located within the surrounding environment 200 of the ego vehicle 102.

The method 500 may proceed to block 512, wherein the method 500 may include evaluating interactions between agents 204 to determine importance information with respect to each particular agent. In an exemplary embodiment, the embedded future bounding boxes associated with the future trajectories of each of the agents 204 may be concatenated with the embedded annotated actions of each of the agents 204. The concatenation may be represented as concatenated trajectory action data 418.

In one embodiment, the concatenated trajectory action data 418 may be inputted to the agent importance processing unit 412 of the neural network 112. The agent importance processing unit 412 may be configured to evaluate interactions between the agents 204 and with respect to the ego motion of the ego vehicle 102 to attach an importance weight with respect to each of the agents 204. Agents that are assigned with an importance weight over a predetermined threshold weight value may be identified as being relevant for predicting the future ego motion 208 of the ego vehicle 102.

The method 500 may proceed to block 514, wherein the method 500 may include predicting the future ego motion of the ego vehicle 102. In an exemplary embodiment, the future ego motion decoder 414 may be configured to embed the predicted future bounding box of all agents $\hat{X}=\{\hat{x}^1, \hat{x}^N\}$ through MLP at each future time stamp $T_{obs}+1$ to $T_{pred}$. This may be conditioned on previously annotated action labels in a feature space through $H_t^{ei}=\Phi(r_{T_{obs}}^{\ 1}\text{Reject}\Phi_r(\hat{x}_t^i))$, where $r_{T_{obs}}^{\ i}=\Phi_r(a_{T_{obs}}^{\ i})$. By using the action labels as a prior constraint, the future ego motion decoder 414 may determine a contextual meaning of locations of each of the agents 204. The resulting features of each agent i are weighted $\hat{H}_t^{ei}=w_t^i*H_t^{ei}$. The future ego motion decoder 414 may thereby sum all features $H_t^e=\Sigma\hat{H}_t^{ei}$ for each future time stamp.

In one embodiment, a last hidden state $h_T^e$ of the past ego motion encoder 404 is concatenated with $H_t^e$ through $\hat{h}_T^{e=\Phi(H}{}_t^e\text{Rejecth}_T^e)$ and fed into the future ego motion decoder 414. The intermediate hidden state $h_t^f$ is accordingly updated by $H_t^e$ at each future time step for recurrent update of the GRU. The future ego motion 208 of the ego vehicle 102 is thereby output using each hidden state $h_t^f$ through $\hat{e}_t^i=\Phi(h_t^f)$ at each future time $T_{obs}+1$ to $T_{pred}$.

The predicted future ego motion 208 of the ego vehicle 102 may be deterministic in its process. However, its multimodality may be derived from sampling of the predicted future bounding boxes of all of the agents 204 located within the surrounding environment 200 of the ego vehicle 102. Accordingly, the neural network 112 may capture the influence of the agents 204 with respect to the ego vehicle 102 and may output agent importance weights consistent with each agents' action and future motion.

The method 500 may proceed to block 516, wherein the method 500 may include updating the ego vehicle operating policy based on the predicted ego motion 208 of the ego vehicle 102 and the predicted future trajectories 206 of the agents 204. In an exemplary embodiment, the future ego motion decoder 414 of the neural network 112 may be configured to output the predicted ego motion 208 of the ego vehicle 102 Ê to the vehicle control module 132 of the future forecasting application 106. Upon receipt of the predicted ego motion 208, the vehicle control module 132 may be configured to extract vehicle dynamic parameters that may be associated with the predicted ego motion 208 of the ego vehicle 102. Such dynamic parameters may include, but may not be limited to, data that pertains to a future position of the ego vehicle 102, a future heading of the ego vehicle 102, a future velocity of the ego vehicle 102, a future steering angle of a steering of the ego vehicle 102, a future steering speed associated with the steering of the ego vehicle 102, a future throttle angle of a throttle of the ego vehicle 102, a future acceleration of the ego vehicle 102, a future yaw rate of the ego vehicle 102, a future brake force associated with the brakes of the ego vehicle 102, a future transmission gear of the ego vehicle 102, a future geo-location of the ego vehicle 102, and the like at one or more future time steps (e.g., t+1, t+2, t+n).

In one embodiment, upon extracting the vehicle dynamic parameters, the vehicle control module 132 may be configured to update the ego vehicle operation policy 126 with the vehicle dynamic parameters that may be based on the future ego motion 208 of the ego vehicle 102, data associated with annotated actions associated with each of the agents 204, and the predicted future trajectories 206 of each of the agents 204. The ego vehicle operation policy 126 may also be updated with data associated with the surrounding environment 200 of the ego vehicle 102 including, but not limited to, locations of static objects 202 and additional environmental attributes (e.g., curvature of roadway, configuration of intersections, and the like).

The method 500 may proceed to block 518, wherein the method 500 may include communicating with the ECU 104 of the ego vehicle 102 to autonomously control the operation of the ego vehicle 102 based on the ego vehicle operation policy 126. In one embodiment, at one or more future time steps, the vehicle control module 132 may be configured to access the ego vehicle operation policy 126 to retrieve the vehicle dynamic parameters associated with the future ego motion 208 of the ego vehicle 102 as output by the future ego motion decoder 414 of the neural network 112.

Upon retrieving the vehicle dynamic parameters, the vehicle control module 132 may be configured to execute the vehicle dynamic parameters to autonomously control the operation of the ego vehicle 102 according to the predicted ego motion 208 of the ego vehicle 102. In some embodiments, the vehicle dynamic parameters may be executed to autonomously control the operation and additional vehicle dynamic parameters may be determined in real-time based on particular environmental factors that may influence the ego motion of the ego vehicle 102. For example, one or more external factors that may include, but may not be limited to, a lane in which the ego vehicle 102 is traveling, status of traffic signals, traffic patterns, traffic regulations, and the like may influence the ego motion of the ego vehicle 102 such that additional vehicle dynamic parameters may be determined by the vehicle control module 132 to account for such factors.

In one or more embodiments, the vehicle control module 132 may thereby operably control one or more components, systems, sub-systems of the ego vehicle 102 to autonomously operate the ego vehicle 102 according to vehicle dynamic parameters (e.g., derived from the future ego motion 208 of the ego vehicle 102 and/or that may be determined in real-time based on environmental factors) to operate in a manner to smoothly navigate within the surrounding environment of the ego vehicle 102. In particular, the ego vehicle 102 may be operably controlled to autonomously operate (e.g., with the application of a particular speed, acceleration, steering angle, throttle angle, braking force, etc.) to smoothly navigate within the surrounding environment of the ego vehicle 102 based on action priors.

Figure 6:
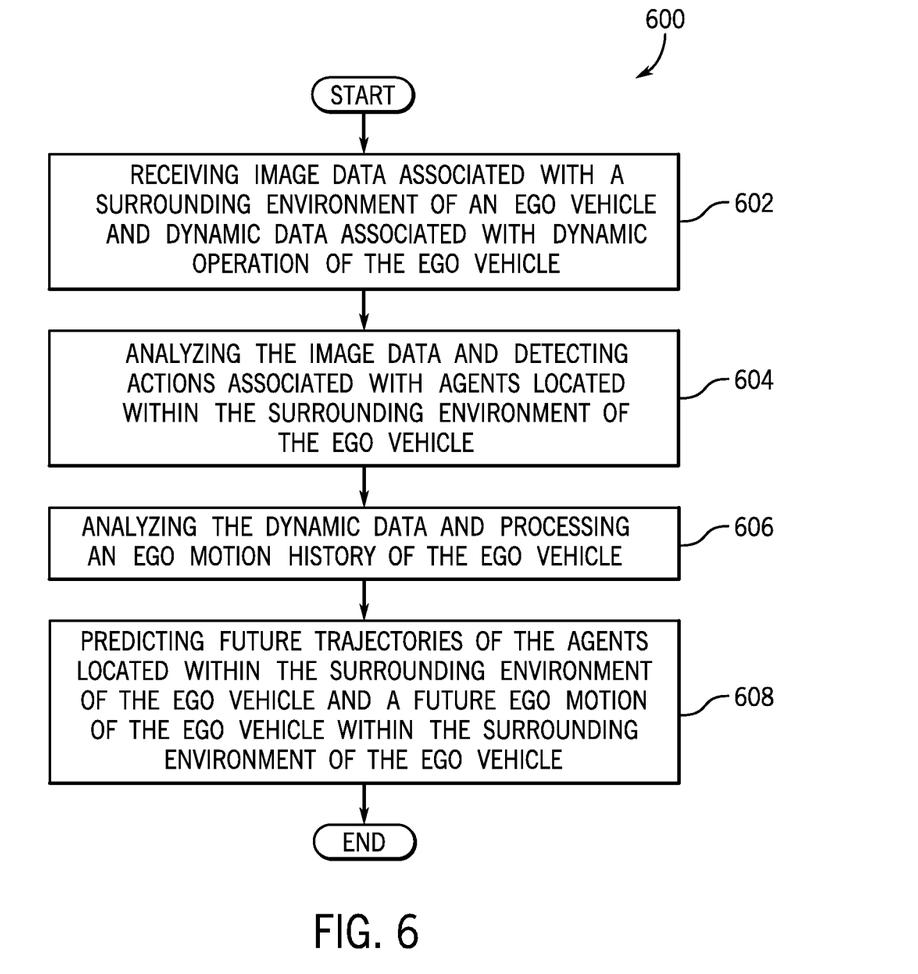
FIG. 6 is a process flow diagram of a method for future forecasting using action priors according to an exemplary embodiment of the present disclosure.

FIG. 6 is a process flow diagram of a method 600 for future forecasting using action priors according to an exemplary embodiment of the present disclosure. FIG. 6 will be described with reference to the components and examples of FIGS. 1-4 though it is to be appreciated that the method 600 of FIG. 6 may be used with other systems/components and in additional exemplary scenarios. The method 600 may begin at block 602, wherein the method 600 may include receiving image data associated with a surrounding environment 200 of an ego vehicle 102 and dynamic data associated with dynamic operation of the ego vehicle 102.

The method 600 may proceed to block 604, wherein the method 600 may include analyzing the image data and detecting actions associated with agents 204 located within the surrounding environment of the ego vehicle 102. The method 600 may proceed to block 606, wherein the method 600 may include analyzing the dynamic data and processing an ego motion history of the ego vehicle 102. The method 600 may proceed to block 608, wherein the method 600 may include predicting future trajectories 206 of the agents 204 located within the surrounding environment 200 of the ego vehicle 102 and a future ego motion 208 of the ego vehicle 102 within the surrounding environment of the ego vehicle 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for future forecasting using action priors comprising:
    receiving image data associated with a surrounding environment of an ego vehicle and dynamic data associated with dynamic operation of the ego vehicle;
    analyzing the image data and detecting actions associated with agents located within the surrounding environment of the ego vehicle, wherein the image data is inputted to an image encoder of a neural network and is analyzed to determine the agents and bounding boxes are computed around each of the agents and are analyzed to detect the actions associated with the agents;
    analyzing the dynamic data and processing an ego motion history of the ego vehicle, wherein a real-time ego motion of the ego vehicle and prior ego motions are aggregated to process the ego motion history that includes vehicle dynamic parameters of the ego vehicle during a predetermined period of time; and
    predicting future trajectories of the agents located within the surrounding environment of the ego vehicle and a future ego motion of the ego vehicle within the surrounding environment of the ego vehicle, encoding past object locations by concatenating detected actions, encoded ego motion of the ego vehicle, and encoded data associated with interactions between the agents, wherein the encoded past object locations are inputted to a future ego motion decoder of the neural network to decode future bounding boxes of the agents at future time steps that pertain to the future trajectories of the agents, wherein the future ego motion is based on the future trajectories of the agents and the ego motion history of the ego vehicle.

2. The computer-implemented method of claim 1, wherein analyzing the image data and detecting actions includes inputting the image data from a vehicle camera system to the image encoder of the neural network, wherein the image data is analyzed to determine stationary objects and dynamic objects that are captured within at least one egocentric image of the surrounding environment of the ego vehicle, wherein the dynamic objects are classified as the agents that are located within the surrounding environment of the ego vehicle.

3. The computer-implemented method of claim 2, wherein analyzing the image data and detecting actions includes analyzing the computed bounding boxes by obtaining a sequence of image patches from each bounding box.

4. The computer-implemented method of claim 3, wherein analyzing the image data and detecting actions includes accessing a localization dataset that includes a plurality of pre-trained action sets that are associated with various type of pedestrian related actions and vehicle related actions, wherein the plurality of pre-trained action sets include annotated actions that are analyzed to detect the actions associated with the agents.

5. The computer-implemented method of claim 4, wherein analyzing the image data and detecting actions includes analyzing the computed bounding boxes with respect to the localization dataset to analyze the plurality of pre-trained action sets to detect the actions associated with the agents.

6. The computer-implemented method of claim 5, wherein analyzing the dynamic data and processing the ego motion history includes receiving a real-time ego motion of the ego vehicle and retrieving prior ego motions stored at one or more prior time stamps.

7. The computer-implemented method of claim 6, wherein predicting future trajectories of the agents located within the surrounding environment of the ego vehicle and the future ego motion of the ego vehicle includes concatenated data utilizing positions of the future bounding boxes to predict the future trajectories of the agents.

8. The computer-implemented method of claim 7, wherein predicting future trajectories of the agents located within the surrounding environment of the ego vehicle and the future ego motion of the ego vehicle includes evaluating interactions between the agents to determine importance information with respect to each particular agent, wherein the future bounding boxes of the agents and the ego motion history of the ego vehicle are analyzed to predict the future ego motion of the ego vehicle during at least one future time step.

9. The computer-implemented method of claim 1, further including extracting vehicle dynamic parameters from the future ego motion of the ego vehicle, wherein the vehicle dynamic parameters are executed to autonomously control operation of the ego vehicle to navigate within the surrounding environment of the ego vehicle based on the action priors.

10. A system for future forecasting using action priors comprising:
    a memory storing instructions when executed by a processor cause the processor to:
    receive image data associated with a surrounding environment of an ego vehicle and dynamic data associated with dynamic operation of the ego vehicle;
    analyze the image data and detect actions associated with agents located within the surrounding environment of the ego vehicle, wherein the image data is inputted to an image encoder of a neural network and is analyzed to determine the agents and bounding boxes are computed around each of the agents and are analyzed to detect the actions associated with the agents;

analyze the dynamic data and process an ego motion history of the ego vehicle, wherein a real-time ego motion of the ego vehicle and prior ego motions are aggregated to process the ego motion history that includes vehicle dynamic parameters of the ego vehicle during a predetermined period of time; and predict future trajectories of the agents located within the surrounding environment of the ego vehicle and a future ego motion of the ego vehicle within the surrounding environment of the ego vehicle, encoding past object locations by concatenating detected actions, encoded ego motion of the ego vehicle, and encoded data associated with interactions between the agents, wherein the encoded past object locations are inputted to a future ego motion decoder of the neural network to decode future bounding boxes of the agents at future time steps that pertain to the future trajectories of the agents, wherein the future ego motion is based on the future trajectories of the agents and the ego motion history of the ego vehicle.

11. The system of claim 10, wherein analyzing the image data and detecting actions includes inputting the image data from a vehicle camera system to the image encoder of the neural network, wherein the image data is analyzed to determine stationary objects and dynamic objects that are captured within at least one egocentric image of the surrounding environment of the ego vehicle, wherein the dynamic objects are classified as the agents that are located within the surrounding environment of the ego vehicle.

12. The system of claim 11, wherein analyzing the image data and detecting actions includes analyzing the computed bounding boxes by obtaining a sequence of image patches from each bounding box.

13. The system of claim 12, wherein analyzing the image data and detecting actions includes accessing a localization dataset that includes a plurality of pre-trained action sets that are associated with various type of pedestrian related actions and vehicle related actions, wherein the plurality of pre-trained action sets include annotated actions that are analyzed to detect the actions associated with the agents.

14. The system of claim 13, wherein analyzing the image data and detecting actions includes analyzing the computed bounding boxes with respect to the localization dataset to analyze the plurality of pre-trained action sets to detect the actions associated with the agents.

15. The system of claim 14, wherein analyzing the dynamic data and processing the ego motion history includes receiving a real-time ego motion of the ego vehicle and retrieving prior ego motions stored at one or more prior time stamps.

16. The system of claim 15, wherein predicting future trajectories of the agents located within the surrounding environment of the ego vehicle and the future ego motion of the ego vehicle includes utilizing positions of the future bounding boxes are utilized to predict the future trajectories of the agents.

17. The system of claim 16, wherein predicting future trajectories of the agents located within the surrounding environment of the ego vehicle and the future ego motion of the ego vehicle includes evaluating interactions between the agents to determine importance information with respect to each particular agent, wherein the future bounding boxes of the agents and the ego motion history of the ego vehicle are analyzed to predict the future ego motion of the ego vehicle during at least one future time step.

18. The system of claim 10, further including extracting vehicle dynamic parameters from the future ego motion of the ego vehicle, wherein the vehicle dynamic parameters are executed to autonomously control operation of the ego vehicle to navigate within the surrounding environment of the ego vehicle based on the action priors.

19. A non-transitory computer readable storage medium storing instructions that when executed by a computer, which includes a processor perform a method, the method comprising:

receiving image data associated with a surrounding environment of an ego vehicle and dynamic data associated with dynamic operation of the ego vehicle;

analyzing the image data and detecting actions associated with agents located within the surrounding environment of the ego vehicle, wherein the image data is inputted to an image encoder of a neural network and is analyzed to determine the agents and bounding boxes are computed around each of the agents and are analyzed to detect the actions associated with the agents;

analyzing the dynamic data and processing an ego motion history of the ego vehicle, wherein a real-time ego motion of the ego vehicle and prior ego motions are aggregated to process the ego motion history that includes vehicle dynamic parameters of the ego vehicle during a predetermined period of time; and predicting future trajectories of the agents located within the surrounding environment of the ego vehicle and a future ego motion of the ego vehicle within the surrounding environment of the ego vehicle, encoding past object locations by concatenating detected actions, encoded ego motion of the ego vehicle, and encoded data associated with interactions between the agents, wherein the encoded past object locations are inputted to a future ego motion decoder of the neural network to decode future bounding boxes of the agents at future time steps that pertain to the future trajectories of the agents, wherein the future ego motion is based on the future trajectories of the agents and the ego motion history of the ego vehicle.

20. The non-transitory computer readable storage medium of claim 19, further including extracting vehicle dynamic parameters from the future ego motion of the ego vehicle, wherein the vehicle dynamic parameters are executed to autonomously control operation of the ego vehicle to navigate within the surrounding environment of the ego vehicle based on action priors.

* * * * *